United States Patent
Han

(10) Patent No.: US 8,471,159 B2
(45) Date of Patent: Jun. 25, 2013

(54) UNDERCARRIAGE AND KEYLOCK ASSEMBLY FOR USE WITH A CIRCUIT BREAKER

(75) Inventor: Weilin Han, Shanghai (CN)

(73) Assignee: General Electric Company, Schenectady, NY (US)

( * ) Notice: Subject to any disclaimer, the term of this patent is extended or adjusted under 35 U.S.C. 154(b) by 340 days.

(21) Appl. No.: 12/946,489

(22) Filed: Nov. 15, 2010

(65) Prior Publication Data
US 2012/0118711 A1 May 17, 2012

(51) Int. Cl.
*H01H 9/20* (2006.01)
*H01H 33/46* (2006.01)
*H01H 33/50* (2006.01)

(52) U.S. Cl.
USPC ........................................ 200/50.25

(58) Field of Classification Search
USPC .......................... 200/50.21–50.26
See application file for complete search history.

(56) References Cited

U.S. PATENT DOCUMENTS

| | | | |
|---|---|---|---|
| 5,288,958 A | 2/1994 | Grunert et al. | |
| 5,463,196 A | 10/1995 | Darimont | |
| 5,609,244 A | 3/1997 | Reiter | |
| 6,596,952 B1 | 7/2003 | Degrazia et al. | |
| 8,294,051 B2 * | 10/2012 | Park et al. | 200/50.21 |
| 2010/0230256 A1 | 9/2010 | Lee et al. | |

* cited by examiner

Primary Examiner — R S Luebke
Assistant Examiner — Lheiren Mae Caroc
(74) Attorney, Agent, or Firm — Global Patent Operation; Stephen G. Midgley

(57) ABSTRACT

An undercarriage for use with a circuit breaker includes a bottom plate, a front beam removably coupled to the bottom plate via a lead screw, wherein the lead screw is configured to engage with a threaded support that is coupled to the bottom plate to facilitate racking the circuit breaker in a switchgear. The undercarriage also includes a keylock assembly configured to enable racking the circuit breaker in the switchgear. The keylock assembly includes a lock and an interlock configured to couple to the lock such that the interlock is movable between a locked position and an unlocked position, wherein engagement of a racking handle with the lead screw is enabled when the interlock is in the unlocked position.

16 Claims, 8 Drawing Sheets

UNDERCARRIAGE AND KEYLOCK ASSEMBLY FOR USE WITH A CIRCUIT BREAKER

BACKGROUND OF THE INVENTION

The embodiments described herein relate generally to power equipment and, more particularly, to a locking mechanism for use with power equipment.

At least some known power equipment devices are designed to be installed in a switchgear. Moreover, some switchgears include a plurality of power sources or connections to external sources, and one or more devices to detect an overcurrent and protect other electrical equipment from damage. In some applications, some devices, such as backup circuit breakers, metering devices, or protection equipment, need to be disconnected from a main circuit prior to being serviced, for example. Accordingly, at least some known switchgears include lockout and/or tagout mechanisms.

However, known carriage assemblies for circuit breakers, for example, generally use external locking mechanisms to prevent the carriage assembly from being installed or "racked in" within the switchgear to a service position. For example, at least some known circuit breaker carriage assemblies use a system of gears to facilitate inserting circuit breaker to a service position within the switchgear or to partially withdraw from the switchgear the circuit breakers to a test position. To prevent the circuit breaker from being racked in and receiving power during service, a brake may be provided that engages the gear system. Moreover, some known circuit breaker carriage assemblies use covers, such as switch covers, that prevent the circuit breaker from receiving power during service. Other known circuit breaker carriage assemblies can include a block or stopper that prevents the circuit breaker from being racked in. However, additional parts, such as brakes, covers, padlocks, and/or blocks can be lost or damaged during transport or in storage. Moreover, each of these mechanisms is external to the circuit breaker and/or the carnage assembly, which can lead to damage during use. Accordingly, it is desirable to provide a locking mechanism that is internal to the carriage assembly and does not require additional separate parts.

BRIEF DESCRIPTION OF THE INVENTION

In one aspect, an undercarriage is provided for use with a circuit breaker and includes a bottom plate, a front beam removably coupled to the bottom plate via a lead screw, wherein the lead screw is configured to engage with a threaded support that is coupled to the bottom plate to facilitate racking the circuit breaker in a switchgear. The undercarriage also includes a keylock assembly configured to enable racking the circuit breaker in the switchgear. The keylock assembly includes a lock and an interlock configured to couple to the lock such that the interlock is movable between a locked position and an unlocked position, wherein engagement of a racking handle with the lead screw is enabled when the interlock is in the unlocked position.

In another aspect, a keylock assembly is provided for use with an undercarriage having a bottom plate and a lead screw coupled to the bottom plate. The keylock assembly includes a lock and an interlock configured to couple to the lock such that the interlock is movable between a locked position and an unlocked position, wherein engagement of a racking handle with the lead screw is enabled when the interlock is in the unlocked position.

In another aspect, a switchgear includes a power source and at least one circuit breaker coupled to the power source. The circuit breaker includes a racking handle, a lead screw configured to engage with the racking handle to facilitate racking the circuit breaker in the switchgear, and a keylock assembly. The keylock assembly includes a lock and an interlock configured to couple to the lock such that the interlock is movable between a locked position and an unlocked position, wherein engagement of the racking handle with the lead screw is enabled when the interlock is in the unlocked position.

DETAILED DESCRIPTION OF THE INVENTION

Exemplary embodiments of apparatuses are described herein for use in preventing power from being applied to devices, such as a circuit breaker, when the devices are not fully engaged within a switchgear. These embodiments facilitate safer operation of a circuit breaker. For example, a keylock assembly can be manipulated such that, when the circuit breaker is at a test position and a keylock assembly is locked, the circuit breaker cannot be inserted or "racked" in the switchgear. This prevents the electrical components in the circuit breaker from becoming energized. Accordingly, service personnel or operators are exposed to less risk of electrical shock. The keylock assembly can also be manipulated to enable the circuit breaker to be racked in the switchgear. The keylock assembly described herein is manipulated between a locked position and an unlocked position using a keyed lock that controls the position of an interlock. The interlock responds to the lock to prevent insertion of a racking handle by interfering with an interface between the racking handle and a lead screw. For example, when the lock is manipulated with a first motion, the lock interacts with the interlock to cause the interlock to engage with a sleeve to interfere with insertion of a racking handle that secures the circuit breaker at a test position within the switchgear. Securing the circuit breaker within the switchgear facilitates reducing the risk of electrical shock. Rather, in order to service the circuit breaker, an operator disengages the keylock assembly from a sleeve via the lock. For example, when the lock is manipulated with a second motion, the lock causes the interlock to disengage with the sleeve, which enables the racking handle to engage with a lead screw so that the circuit breaker can then be racked at a service position. This enables electrical power to the circuit breaker and so that service may be performed.

Figure 1:
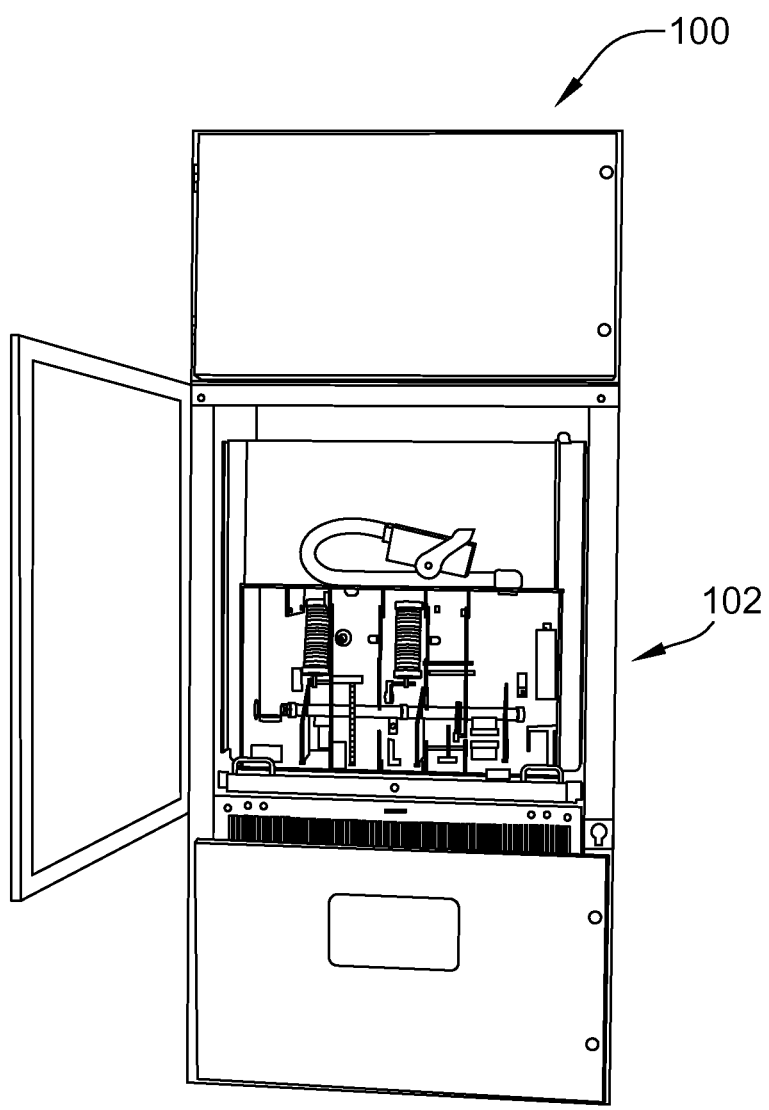
FIG. 1 is a view of an exemplary switchgear.

FIG. 1 is a view of an exemplary switchgear 100 for use with an electrical device 102. In the exemplary embodiment, switchgear 100 includes power distribution equipment and/or devices such as, but not limited to, circuit breakers, electrical lockout devices, load centers, earthing trucks, and/or metering units (none shown in FIG. 1). In some embodiments, the devices are inserted into switchgear 100 via guide rails to facilitate installation and/or service procedures.

Figure 2:
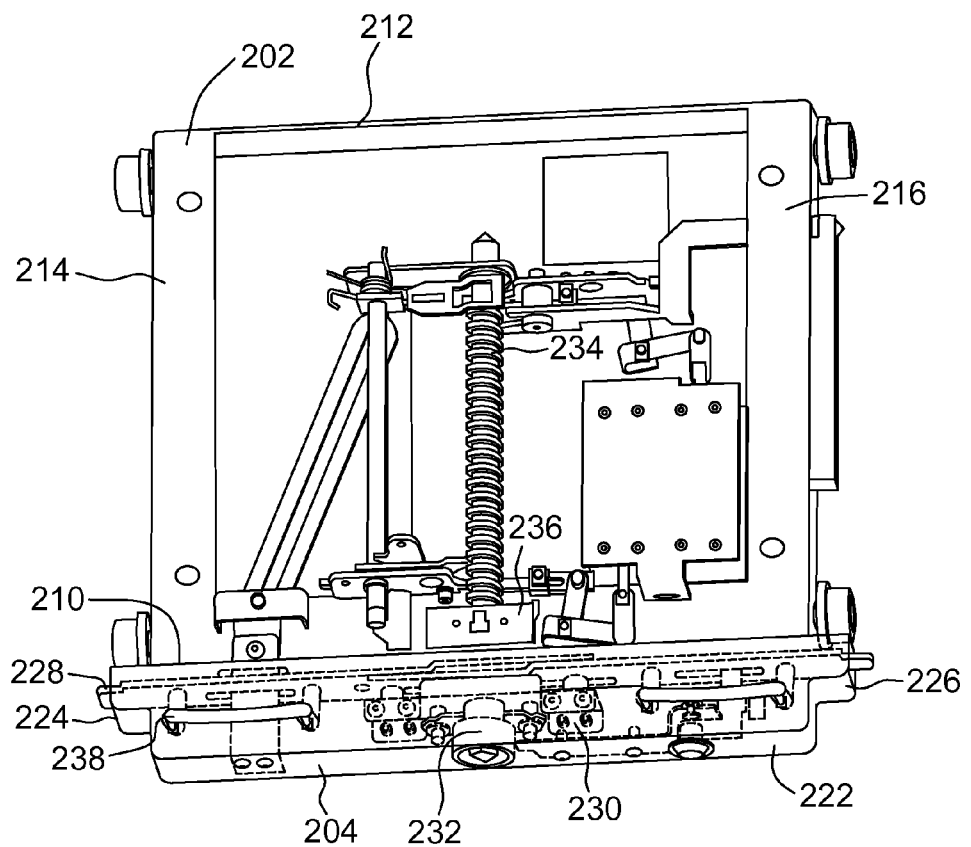
FIG. 2 is a top view of an exemplary undercarriage as a sub-assembly of a circuit breaker that may be used with the switchgear shown in FIG. 1.
Figure 3:
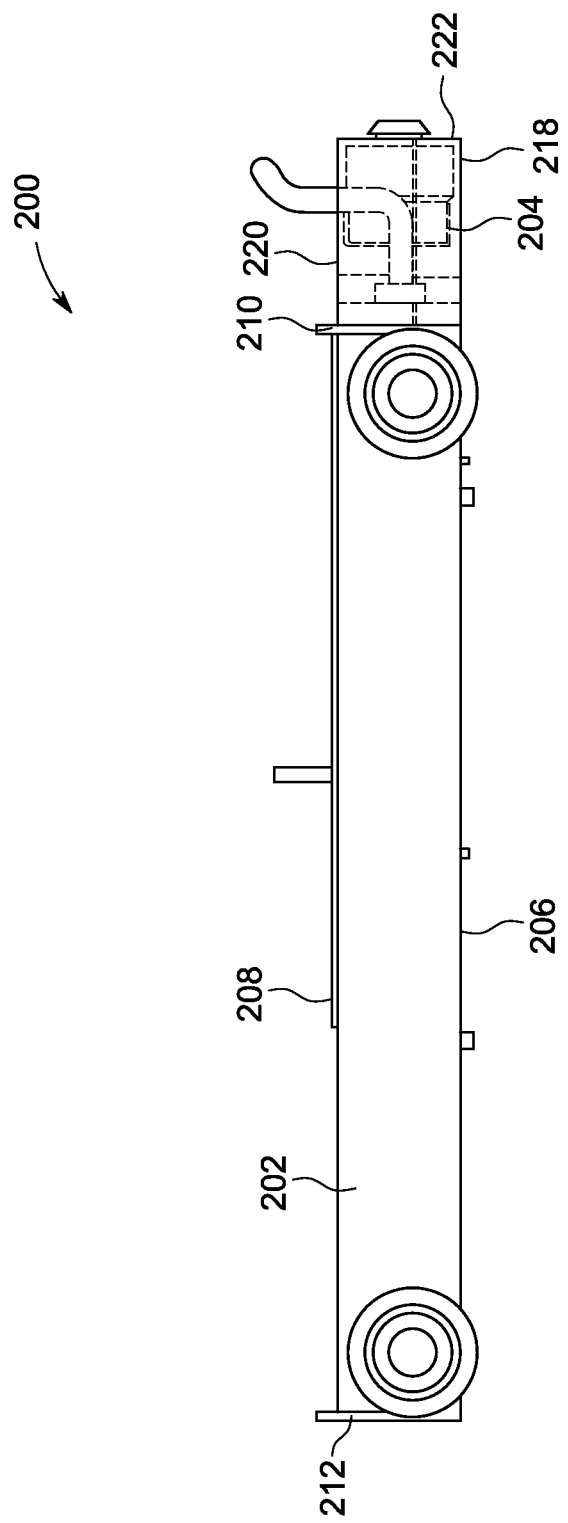
FIG. 3 is a side view of the undercarriage shown in FIG. 2.

FIG. 2 is a top view of an exemplary undercarriage 200, which is a sub-assembly of a circuit breaker or similar device, and that may be installed within switchgear 100 (shown in FIG. 1). FIG. 3 is a side view of undercarriage 200. In the exemplary embodiment, undercarriage 200 includes a bottom plate 202 and a front beam or fascia 204 that is removably coupled to bottom plate 202. Bottom plate 202 includes a bottom surface 206, an opposite top surface 208, and a set of walls, including a front wall 210, an opposite rear wall 212, a first, or right side, sidewall 214, and an opposite second, or left side, sidewall 216. Similarly, front beam 204 includes a bottom surface 218 and an opposite top surface 220. Moreover, front beam 204 includes a front wall 222, a first, or right side, sidewall 224, and an opposite second, or left side, sidewall 226. When front beam 204 is coupled to bottom plate 202, a rear rim (not shown) of front beam 204 is substantially aligned with, and in contact with, bottom plate front wall 210. Furthermore, when front beam 204 is coupled to bottom plate 202, front beam bottom surface 218 lies in substantially the same plane as a plane defined by a plurality of wheels that are positioned along first sidewall 214 and second side wall 216.

A plurality of locking tabs 228 extends from sidewalls 224 and 226, and are sized to be inserted into corresponding slots formed in side portions of switchgear 100. Moreover, an interior bracket 230 is coupled, such as fixedly coupled, to front beam 204, and a sleeve 232 is coupled, such as fixedly coupled, to bracket 230. Front beam 204 also includes a lead screw 234 that extends through sleeve 232 and engages with a threaded support 236, such as a nut, that is fixed on bottom plate front wall 210. Sleeve 232 is sized to receive a racking handle (not shown) that drives lead screw 234. Moreover, engagement of the racking handle with lead screw 234 facilitates racking in bottom plate 202 in switchgear 100 to a service position and/or racking out bottom plate 202 in switchgear 100 to a test position. At the test position, bottom plate 202 is coupled to front beam 204. In some embodiments, handles 238 are coupled to locking tabs 228.

Figure 4:
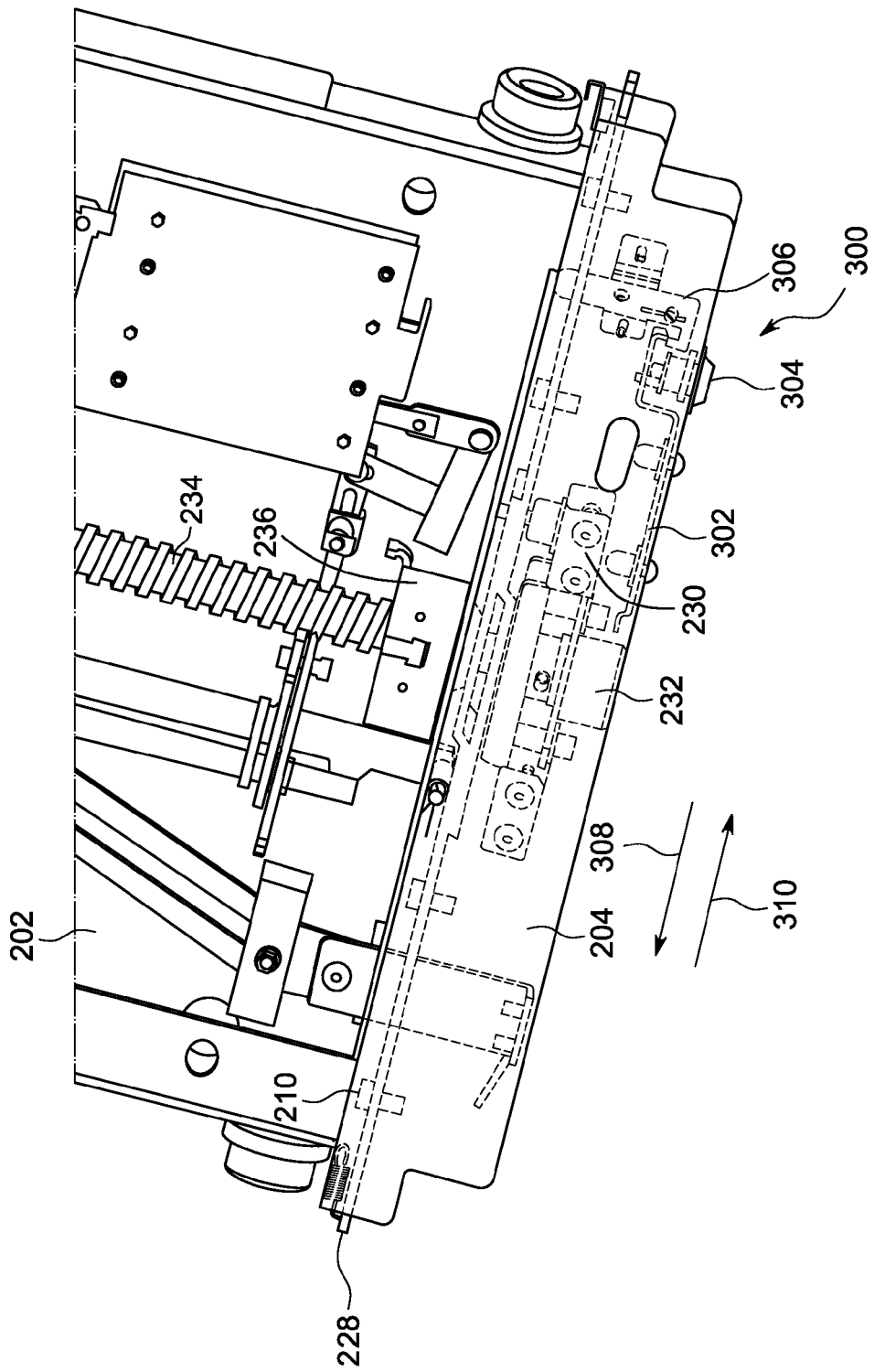
FIG. 4 is a perspective view of the undercarriage shown in FIGS. 2 and 3.

FIG. 4 is a perspective view of undercarriage 200. As shown in FIG. 4, undercarriage 200 includes a keylock assembly 300 that enables and disables racking in bottom plate 202. Keylock assembly 300 includes an interlock 302, a lock 304, and a hooking mechanism 306. In some embodiments, interlock 302 is a bar. However, interlock 302 may instead be embodied as a disk driven by a cam, or any other suitable device that enables and disables engagement of the racking handle with lead screw 234. In the exemplary embodiment, interlock 302 is movable, such as slidably movable, in a first direction 308 and a second direction 310. More specifically, interlock 302 is movable between a locked position and an unlocked position. For example, interlock 302 is moveable in first direction 308 to the locked position that prevents access to the racking handle to facilitate racking in bottom plate 202 from a test position to a service position. In addition, interlock 302 is moveable in second direction 310 to the unlocked position that enables access to the racking handle to facilitate racking out bottom plate 202 from the service position to the test position.

Figure 5:
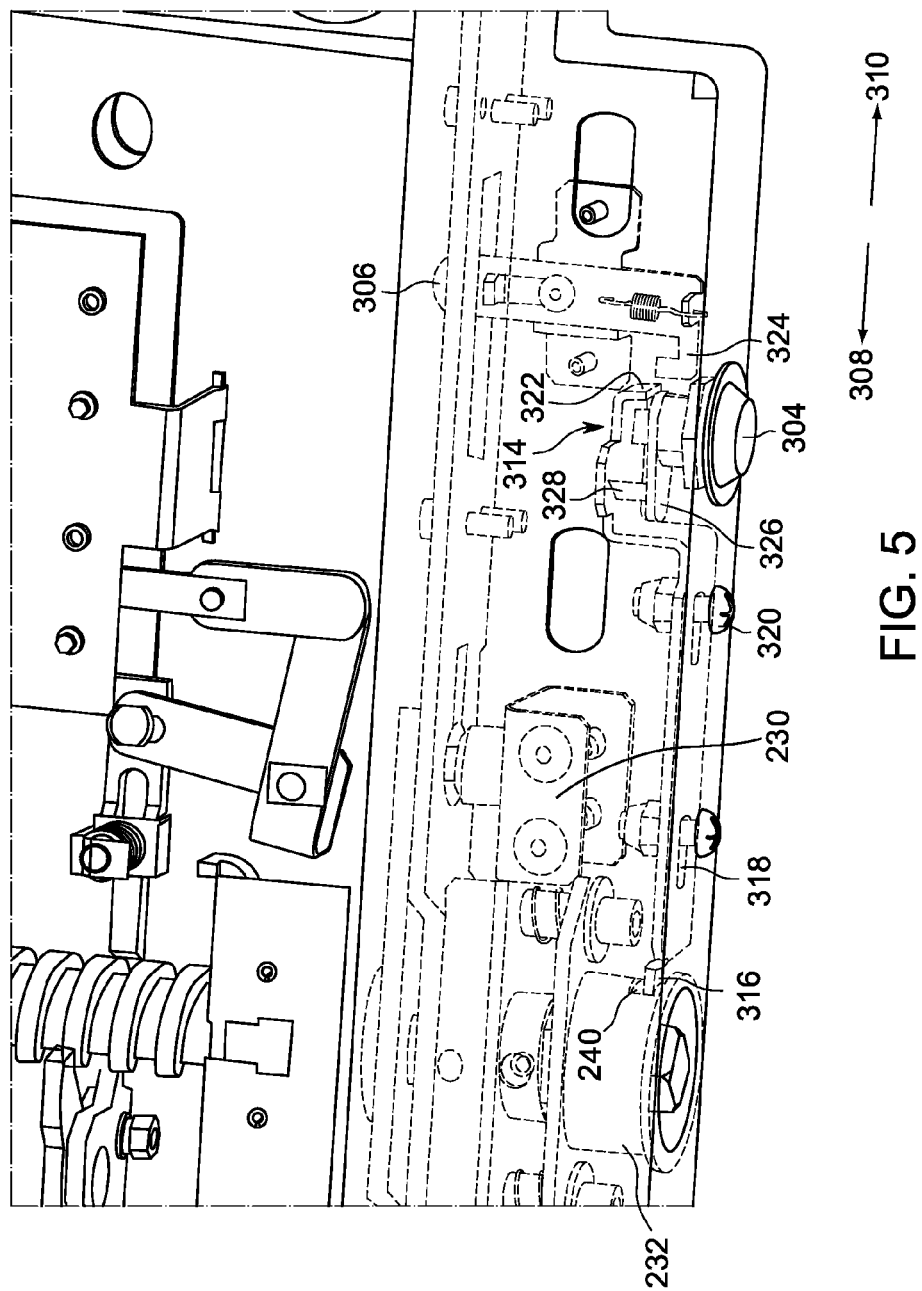
FIG. 5 is a top view of an exemplary keylock assembly that may be used with the undercarriage shown in FIGS. 2-4 when an interlock bar is at a locked position.
Figure 6:
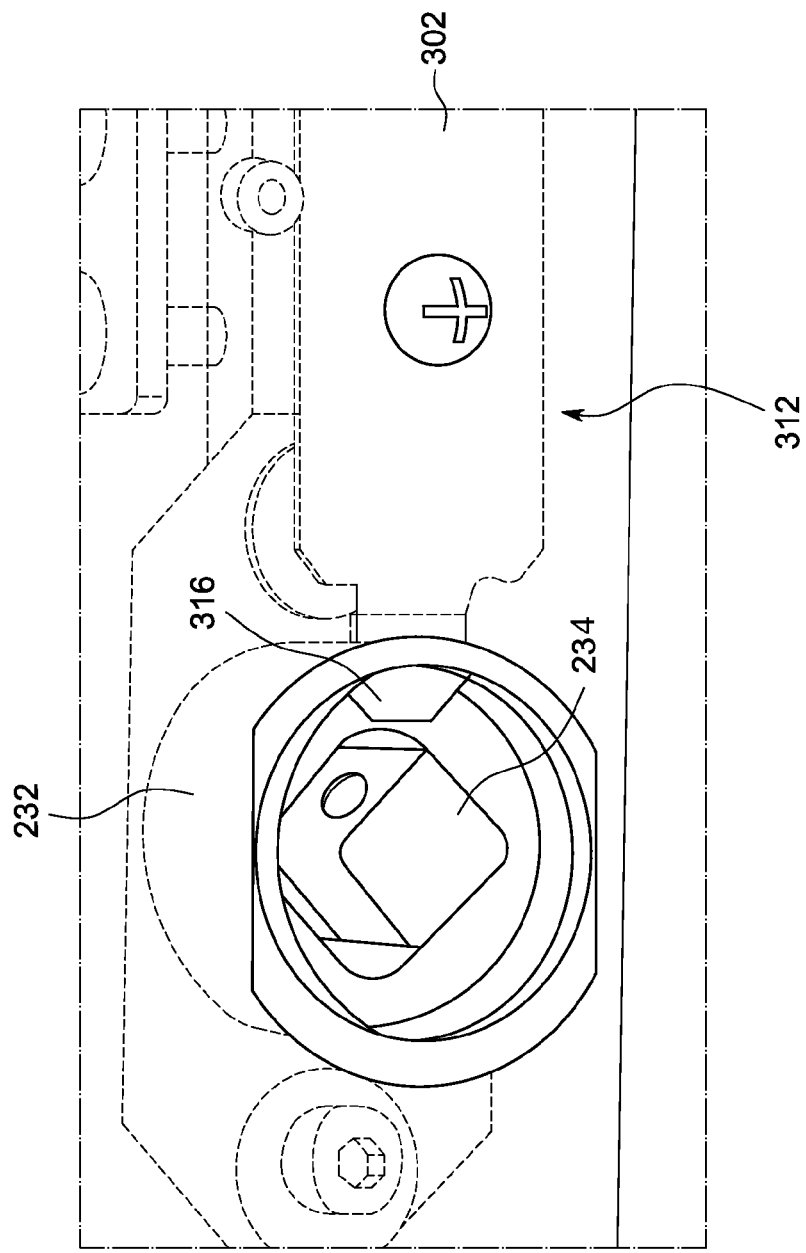
FIG. 6 is a close-up view of a sleeve and an interlock bar that may be used with the keylock assembly shown in FIG. 5.

FIG. 5 is a top view of keylock assembly 300 when interlock 302 is in the locked position to prevent racking in bottom plate 202 to a service position. FIG. 6 is a close-up view of sleeve 232 and interlock 302. In the exemplary embodiment, interlock 302 includes a first end 312 and an opposite second end 314. A tongue 316 is provided at first end 312, and is sized to be inserted into a slot 240 that extends through sleeve 232 to interfere with engagement of the racking handle and lead screw 234. A plurality of guide slots 318 extend through interlock 302 and are each sized to receive a respective guide pin 320 to guide interlock 302 in first direction 308 and in second direction 310. Interlock 302 also includes a first hook portion 322 at second end 314. First hook portion 322 moves between a first position and a second position according to the movement of interlock 302. Hooking mechanism 306 includes a second hook portion 324 that is shaped to lock first hook portion 322 in the first position when interlock 302 is in the unlocked position as described in greater detail below.

Moreover, lock 304 includes a gear 326 and an arm 328 that is coupled to gear 324. Arm 328 extends through an arm slot 330 that extends through interlock 302 at second end 314. Arm 328 is movable between a first position and a second position according to a user action. For example, when a user inserts a key (not shown) into lock 304 and turns the key counterclockwise, gear 326 moves arm 328 in first direction 308 (shown in FIG. 5). The movement of arm 328 in first direction 308 causes interlock 302 to likewise move in first direction 308 such that tongue 316 is inserted into slot 240. Accordingly, and as shown in FIG. 6, interlock 302 moves in first direction 308 to the locked position, which prevents engagement of the racking handle with lead screw 234, and which prevents bottom plate 202 to be racked in the service position. Moreover, first hook portion 322 is moved to the first position and is disengaged with second hook portion 324. Similarly, when the user turns the key clockwise from the locked position, gear 326 moves arm 328 in second direction 310 (shown in FIG. 4). The movement of arm 328 in second direction 310 causes interlock 302 to likewise move in second direction 310 such that tongue 316 is removed from slot 240. Moreover, first hook portion 322 is moved to the second position. Accordingly, interlock 302 moves in second direction 310 to the unlocked position, which enables engagement of the racking handle with lead screw 234, and enables bottom plate 202 to be racked in the service position.

Figure 7:
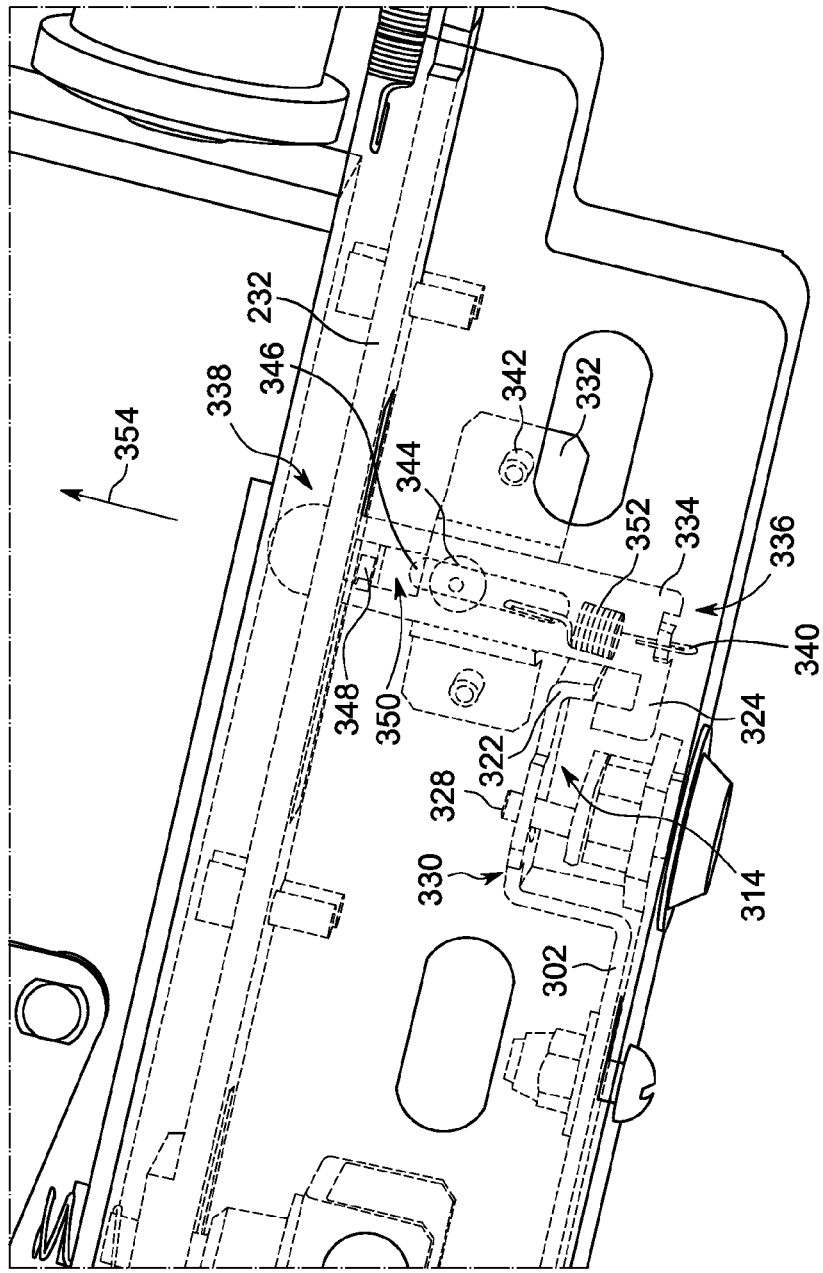
FIG. 7 is another top view of the keylock assembly shown in FIG. 5 when the interlock bar is at an unlocked position.
Figure 8:
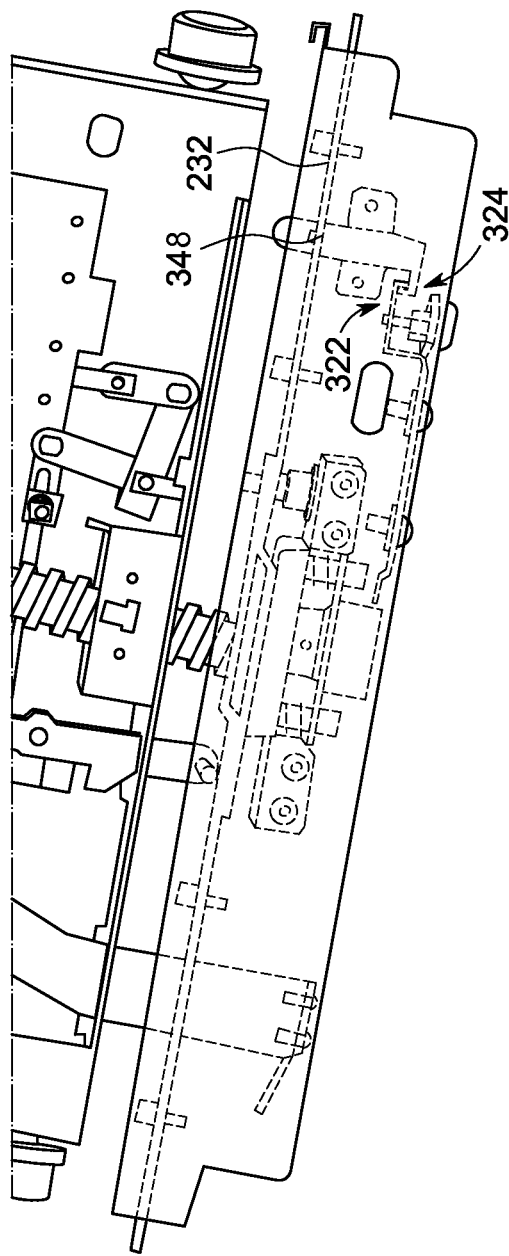
FIG. 8 is another top view of the undercarriage shown in FIGS. 2-4, when a bottom plate is at an intermediate or service position.

FIG. 7 is another top view of lock 304, interlock second end 314, and hooking mechanism 306. FIG. 8 is a top view of bottom plate 202 in an intermediate or service position, wherein bottom plate 202 is removed from front beam 204. As shown in FIG. 7, hooking mechanism 306 includes a base portion 332 and a top portion 334. Top portion 334 includes a first end 336 and an opposite second end 338. Second hook portion 324 and a first lip portion 340 are provided at first end 336. The first position of top portion 334 corresponds with the intermediate or service position of bottom plate 202, and the second position of top portion 334 corresponds with the test position of bottom plate 202. Hooking mechanism 306 is coupled to front beam 204 via a plurality of mounting screws 342 that extend through base portion 332 and into front beam 204. Top portion 334 is movably coupled to base portion 332 via a fastening mechanism 344, such as a screw, pin, or rivet which extends through a guide slot 346 formed in base portion 332. Base portion 332 includes a second lip portion 348 that extends through a slot 350 formed in top portion 334 at second end 338. A spring 352 is engaged with first and second lip portions 340 and 348 to move top portion 334 between a first position and a second position.

Second hook portion 324 is oriented in an opposite manner from first hook portion 322 such that, when interlock 302 is in the unlocked position and bottom plate 202 is in the intermediate or service position, hooking mechanism 306 moves in a third direction 354 that is substantially perpendicular to first direction 308 and second direction 310 (both shown in FIG. 4). More specifically, top portion 334 moves in third direction 354. The movement is caused by spring 352 and is stopped by an interaction between an end of slot 350 or guide slot 346 and fastening mechanism 344. As shown in FIG. 8, when interlock 302 is in the unlocked position, and bottom plate 202 is at the intermediate or service position, second hook portion 324 engages first hook portion 322. Specifically, hooking mechanism 306 slides in third direction 354 and second hook portion 324 engages first hook portion 322 such that interlock 302 is no longer movable in first direction 308. In other words, gear 326 is locked in position and cannot move interlock 302 in first direction 308 via arm 328. Furthermore, when bottom plate 202 is at a test position and interlock 302 is at a locked position, a key for use in lock 304 can be removed. In the exemplary embodiment, interlock 302 cannot be unlocked without the key, thereby maintaining bottom plate 202 at the test position and preventing the circuit breaker from being put into service.

Exemplary embodiments of apparatus, such as switchgears, are provided for use in double power sources, which includes two circuit breakers at each power source and a third circuit breaker for use as a bustle that connects two busses. The two circuit breakers connect each power source to a corresponding bus. These circuit breakers include two keys such that only one of the power source circuit breakers and the bustie circuit breaker can be put into service at the same time, while the other power source circuit breaker is out of service. Moreover, when an interlock of one of the power source circuit breakers is not locked, a key for use with the interlock cannot be removed and the remaining power source circuit breaker cannot be put into service. The embodiments are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary electrical equipment environment, embodiments of the invention are operational with numerous other general purpose or special purpose electrical equipment environments or configurations. These environments are not intended to suggest any limitation as to the scope of use or functionality of any aspect of the invention. Moreover, these environments should not be interpreted as having any dependency or requirement relating to any one or combination of components illustrated in the exemplary operating environment.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An undercarriage for use with a circuit breaker, said undercarriage comprising:
    a bottom plate;
    a front beam removably coupled to said bottom plate;
    a lead screw configured to engage with a threaded support that is coupled to said bottom plate to facilitate racking the circuit breaker in a switchgear; and
    a keylock assembly configured to enable racking the circuit breaker in the switchgear, said keylock assembly comprising:
        a lock;
        an interlock configured to couple to said lock such that said interlock is movable between a locked position and an unlocked position, wherein engagement of a racking handle with said lead screw is enabled when said interlock is in the unlocked position; and wherein said lock comprises an arm and a gear configured to move said arm between a first position and a second position, and wherein said interlock is in the locked position when said arm is in the first position, and said interlock is in the unlocked position when said arm is in the second position.

2. An undercarriage in accordance with claim 1, wherein said interlock comprises a slot configured to receive said arm and to enable said arm to move between the first position and the second position.

3. An undercarriage in accordance with claim 1, wherein said interlock comprises a first end configured to interfere with engagement of the racking handle with said lead screw when said interlock is in the locked position.

4. An undercarriage in accordance with claim 3, wherein said interlock further comprises a second end comprising a first hook portion, and wherein said keylock assembly further comprises a hooking mechanism configured to be coupled to said front beam, said hooking mechanism comprising a first end, a second end, and a second hook portion at said first end.

5. An undercarriage in accordance with claim 4, wherein said first hook portion is movable between a first position and a second position such that, when said first hook portion is in the first position, engagement of the racking handle with said lead screw is enabled.

6. An undercarriage in accordance with claim 4, wherein said hooking mechanism is movable between a first position and a second position, the first position corresponding to the unlocked position of said interlock, and wherein said hooking mechanism further comprises a lip portion and a spring configured to be coupled to said lip portion, said lip portion configured to stop movement of said hooking mechanism at the second position.

7. An undercarriage in accordance with claim 1, wherein when said interlock is in the locked position, removal of a key for use with said lock is enabled, and wherein said interlock is in the unlocked position, removal of the key is disabled.

8. A keylock assembly in accordance with claim 7, wherein when said interlock is in the locked position, removal of a key for use with said lock is enabled, and wherein said interlock is in the unlocked position, removal of the key is disabled.

9. A keylock assembly for use with an undercarriage having a bottom plate and a lead screw coupled to the bottom plate, said keylock assembly comprising:
    a lock; and an interlock configured to couple to said lock such that said interlock is movable between a locked position and an unlocked position, wherein engagement of a racking handle with the lead screw is enabled when said interlock is in the unlocked position; wherein said lock comprises an arm and a gear that is configured to move said arm between a first position and a second position.

10. A keylock assembly in accordance with claim 9, wherein said interlock is in the locked position when said arm is in the first position, said interlock is in the unlocked position when said arm is in the second position, and said interlock comprises a slot configured to receive said arm and to enable said arm to move between the first position and the second position.

11. A keylock assembly in accordance with claim 9, wherein said interlock comprises a first end configured to interfere with engagement of the racking handle with the lead screw when said interlock is in the locked position.

12. A keylock assembly in accordance with claim 11, wherein the undercarriage further includes a front beam removably coupled to the bottom plate, said interlock further comprises a second end comprising a first hook portion, and wherein said keylock assembly further comprises a hooking mechanism configured to be coupled to the front beam, said hooking mechanism comprising a first end, a second end, and a second hook portion at said first end.

13. A keylock assembly in accordance with claim 12, wherein said first hook portion is movable between a first position and a second position such that, when said first hook portion is in the first position, engagement of the racking handle with the lead screw is enabled.

14. A keylock assembly in accordance with claim 12, wherein said hooking mechanism is movable between a first position and a second position, the first position corresponding to the unlocked position of said interlock, and wherein said hooking mechanism further comprises a lip portion and a spring configured to couple to said lip portion, said lip portion configured to stop movement of said hooking mechanism at the second position.

15. A switchgear comprising:
a power source; and
at least one circuit breaker coupled to said power source, said at least one circuit breaker comprising:
 a racking handle;
 a lead screw configured to engage with said racking handle to facilitate racking said at least one circuit breaker in said switchgear; and
 a keylock assembly comprising:
  a lock;
an interlock configured to couple to said lock such that said interlock is movable between a locked position and an unlocked position, wherein engagement of said racking handle with said lead screw is enabled when said interlock is in the unlocked;
wherein said interlock comprises a first end configured to disable engagement of said racking handle with said lead screw when said interlock is in the locked position; and
wherein said interlock further comprises a second end comprising a first hook portion, and wherein said keylock assembly further comprises a hooking mechanism comprising a first end, a second end, and a second hook portion at said first end, said first hook portion is movable between a first position and a second position such that, when said first hook portion is in the first position, engagement of said racking handle with said lead screw is enabled.

16. A switchgear in accordance with claim 15, wherein said hooking mechanism is movable between a first position and a second position, the first position corresponding to the unlocked position of said interlock, and wherein said hooking mechanism further comprises a lip portion and a spring configured to be coupled to said lip portion, said lip portion configured to stop movement of said hooking mechanism at the second position.

* * * * *

UNITED STATES PATENT AND TRADEMARK OFFICE
CERTIFICATE OF CORRECTION

| | |
|---|---|
| PATENT NO. | : 8,471,159 B2 |
| APPLICATION NO. | : 12/946489 |
| DATED | : June 25, 2013 |
| INVENTOR(S) | : Han |

It is certified that error appears in the above-identified patent and that said Letters Patent is hereby corrected as shown below:

In the Specification

In Column 1, Line 40, delete "carnage" and insert -- carriage --, therefor.

In Column 4, Line 18, delete "gear 324." and insert -- gear 326. --, therefor.

In Column 4, Line 58, delete "rivet" and insert -- rivet, --, therefor.

In the Claims

In Column 8, Line 16, in Claim 15, delete "unlocked;" and insert -- unlocked position; --, therefor.

Page 1 of 1

Signed and Sealed this
Twenty-fourth Day of September, 2013

Teresa Stanek Rea
*Deputy Director of the United States Patent and Trademark Office*